(12) United States Patent
Kitamura et al.

(10) Patent No.: US 6,796,521 B2
(45) Date of Patent: Sep. 28, 2004

(54) MAGNETIC TAPE CARTRIDGE

(75) Inventors: Kouta Kitamura, Kanagawa (JP);
Hideaki Shiga, Kanagawa (JP);
Hidetoshi Yamamoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 70 days.

(21) Appl. No.: 10/151,872

(22) Filed: May 22, 2002

(65) Prior Publication Data

US 2002/0175240 A1 Nov. 28, 2002

(30) Foreign Application Priority Data

| | | |
|---|---|---|
| May 30, 2001 | (JP) | 2001-161622 |
| May 31, 2001 | (JP) | 2001-164904 |
| May 24, 2001 | (JP) | 2001-154899 |
| Sep. 10, 2001 | (JP) | 2001-273642 |

(51) Int. Cl.$^7$ .......................................... G11B 23/107
(52) U.S. Cl. .................... 242/348.2; 360/132
(58) Field of Search ............................. 242/348, 348.2; 360/132

(56) References Cited

FOREIGN PATENT DOCUMENTS

| | | | |
|---|---|---|---|
| EP | 0924702 | * | 6/1999 |
| JP | 11-265560 | | 9/1999 |

* cited by examiner

*Primary Examiner*—John Q. Nguyen
(74) *Attorney, Agent, or Firm*—Sughrue Mion, PLLC

(57) ABSTRACT

A magnetic tape cartridge, which can be assembled using an automated products line by enabling the assembling operation of a spring member and a slide door with ease. For attaining these problems, there is provided a magnetic tape cartridge comprising a magnetic tape cartridge comprising; an opening provided on one side wall of a cartridge case, and is used for tape drawing; a slide door slidably supported by a guide part disposed along said one side wall, and said slide door is used achieving the shutting-and-opening operation of said opening; spring member for impelling said slide door to the shutting direction side, and tape drawing; placed on said guide part; and a leading part for leading one end part of said spring member to a spring engaging part provided on said slide door, and is provided at one end part of said spring member.

4 Claims, 15 Drawing Sheets

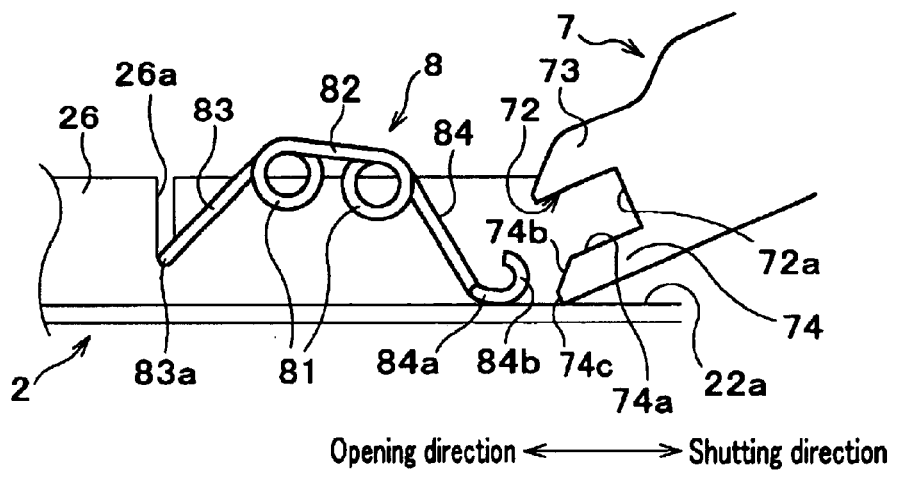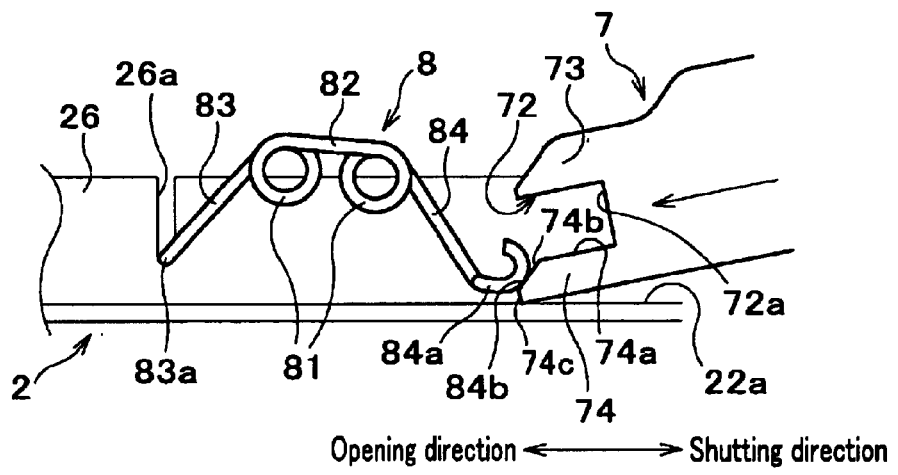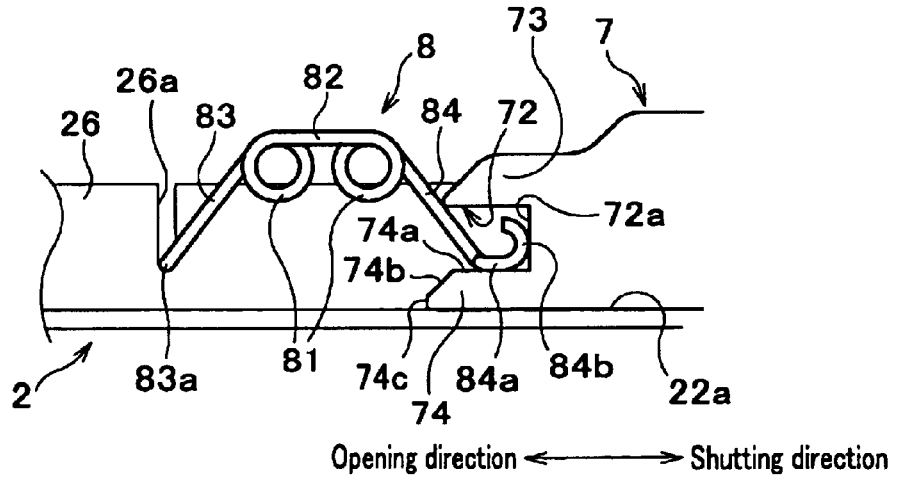

Opening direction ←——→ Shutting direction

Opening direction ←——→ Shutting direction

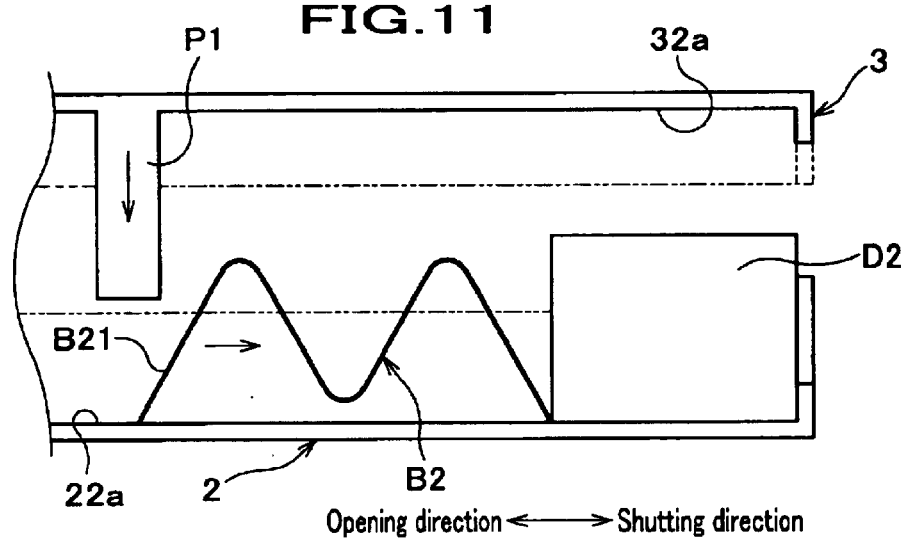
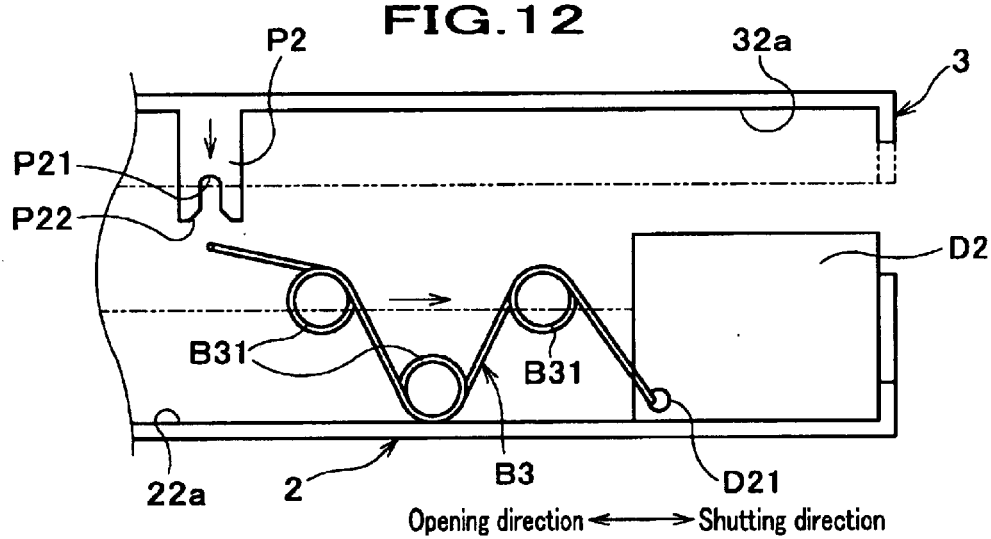
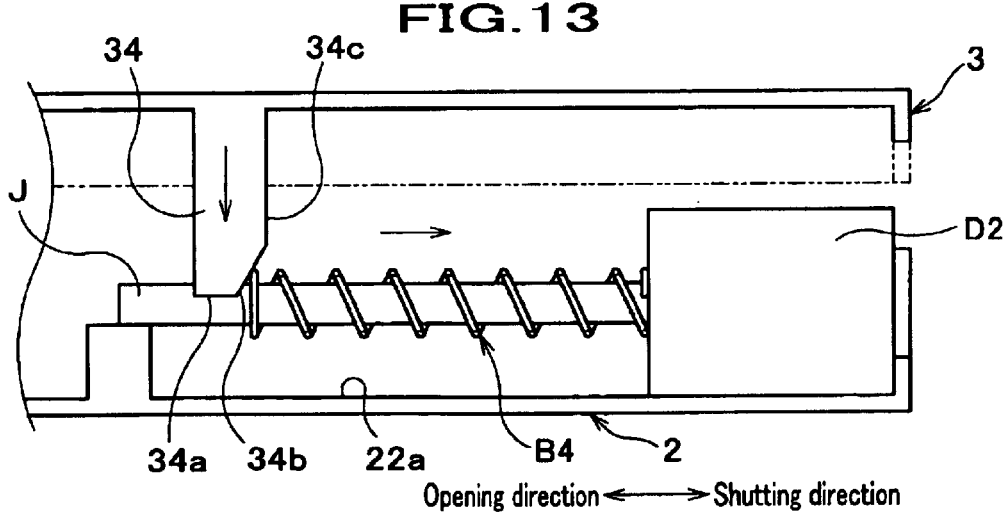

Opening direction ←——→ Shutting direction

Opening direction ←——→ Shutting direction

Opening direction ⟵⟶ Shutting direction

Opening direction ⟵⟶ Shutting direction

MAGNETIC TAPE CARTRIDGE

BACKGROUND OF THE INVENTION

1. Field of the Invention

The present invention relates to a magnetic tape cartridge, in which a single reel, a magnetic tape is wound thereon, is rotatably stored, and is composed of an upper half, a lower half, an opening for drawing the magnetic tape, and a slide door for achieving the opening-and-shutting of the opening. More specifically, the present invention relates to a spring member, which impels a slide door to the shutting direction for shutting the opening of the magnetic tape cartridge.

2. Description of the Related Art

In the magnetic tape cartridge used as the external recording medium for recording the back up data of a computer etc, a single reel, a magnetic tape is to be wound, is rotatably stored within a cartridge case. This cartridge case is composed of an upper half and a lower half, and has a nearly flat square shape.

In the occasion of using, a magnetic tape is drawn out from the cartridge case, and is wound by the reel mounted on a read-write apparatus. Thus the magnetic tape is traveled.

An opening for drawing the magnetic tape is formed on the sidewall of the cartridge case. This opening is normally covered for preventing the intrusion of the dust, and is opened at the time of drawing a magnetic tape for recording or replaying the data on the magnetic tape using the recording-writing apparatus.

In the magnetic tape cartridge as represented by LTO (Linear tape open circuit) standard among these conventional magnetic tape cartridges, a slide door for achieving the opening-and-shutting of the opening is arranged so as to slide along the inside of the sidewall of the cartridge case.

The slide door is fit with a guide groove formed on the upper half and the lower half, respectively, for smoothly achieving the opening-and-shutting movement along the guide grooves. The slide door is impelled to the shutting direction by the spring member except for at the time of using.

As an construction of such type of magnetic tape cartridge, as shown in FIG. 17, an guide groove 101b is provided on the lower half 101 along the side wall 101a. A hooking part 101d having a canaliform shape is formed on a rib 101c provided at the inward side of the side wall 101a.

In this construction, a spring arm 102a of the spring member 102 is hooked on the hooking part 101d, and a spring arm 102b is fit on a notching part 103a provided in the opening direction side of the slide door 103. Thus, the slide door 103 is impelled toward the shutting direction side.

For achieving the certain hooking with the hooking part 101d, a tip part 102c of the spring arm 102a is bent in the perpendicular direction with respect to the rib 101c.

On the other hand, for achieving the certain contact with the notching part 103a, the spring arm 102b is bent toward the slide door 103 side, and also for achieving the certain hooking and impelling of the notching part 103a, a tip part 102d of the spring arm 102b is bent in the shutting direction side.

When assembling the magnetic tape cartridge having a conventional construction, after attaching the spring arm 102a to the hooking part 101d, the slide door 103 is attached to the lower half 101.

At this time, as shown in FIG. 18A, the slide door 103 is pushed toward the opening direction side while keeping the condition that the opening direction side thereof is tilting downwardly, and then engaged to the guide groove 101b.

In this assembling manner, as shown in FIG. 18B, since the bottom end of the slide door 103 is stuck with the tip part 102d of the spring arm 102b, the opening direction side of the slide door 103 should be picked up for releasing from the stuck condition and for achieving the assembling.

In the assembling of the spring member and the slide door, consequently, thousands of man-hours are required, and the automatization of the product line of a magnetic tape cartridge had been made difficult.

In the assembling of the magnetic tape cartridge having a structure of shown in FIG. 19, the magnetic tape cartridge is assembled as below.

First, each parts, such as a reel, a breakable tab for preventing the accidentally erase, and the likes, are disposed at the predetermined position of the lower half. And then, as shown in FIG. 19, a spring member 201 and a slide door 202 are placed on the guide groove 203a of the lower half 203. Hereat, the spring member 201 is arranged in the bridging condition so that the slide door 202 is constantly impelled to the shutting direction side.

Until the upper half (not shown) and the lower half 203 are assembled together, however, only the lower part of the slide door 202 is supported by an slider stop 204 of the lower half 203. To be more precise, about ⅕ of an overall height length of the slide door 202 is supported. In this state, since the upper part of the slide door 202 is not restricted, the slide door 202 tends to be lifted upwardly. This lifting movement is caused by the urging force brought by the spring member 201 which makes the slide door 202 rotate centering on the bottom end in the shutting direction side of the slide door 202.

When the assembling of the upper half and the lower half 203 is continued as it is, therefore, the engagement of the slide door 202 with the guide groove of the upper half or the lower half 203 is disturbed. As a result of this disturbance, the automatization of the product line of the magnetic tape cartridge becomes difficult.

SUMMARY OF THE INVENTION

The present invention aim at providing the magnetic tape cartridge, which can easily assembled using the automated product line by making the assembling operation of the spring member and the slide door easier.

For attaining the above described objects, there is provided a magnetic tape cartridge comprising; an opening provided on one side wall of a cartridge case, and is used for tape drawing; a slide door slidably supported by a guide part disposed along said one side wall, and said slide door is used for achieving the shutting-and-opening operation of said opening; a spring member for impelling said slide door to the shutting direction side, and is placed on said guide part; and a leading part for leading one end part of said spring member to a spring engaging part provided on said slide door, and is provided at one end part of said spring member.

According to the present invention, since the guide part 72 is provided at one end part (end part in the shutting direction side) of the spring member, the tip part of the spring arm is guided to the notching part of the slide door without interference, when the slide door is attached to the guide part of the cartridge case onto which the spring member is disposed.

BRIEF DESCRIPTION OF THE DRAWINGS

FIG. 3A is a cross sectional view showing the condition that the spring member is attached to the lower half according to the present invention.

FIG. 3B is a cross sectional view showing the condition that the guide part of the spring member is lifted up by the slope of the slide door.

FIG. 3C is a cross sectional view showing the condition that the guide part of the slide door is certainly attached to the guide groove.

FIG. 11 is a sectional view showing the another preferred embodiment of the magnetic tape cartridge according to the present invention.

FIG. 12 is a sectional view showing the other preferred embodiment of the magnetic tape cartridge according to the present invention.

FIG. 13 is a sectional view showing the another preferred embodiment of the magnetic tape cartridge according to the present invention.

BRIEF DESCRIPTION OF THE PREFERRED EMBODIMENT

The First Preferred Embodiment

The explanation about the magnetic tape cartridge according to the present invention will be carried out referring to the attached drawings.

Figure 1:
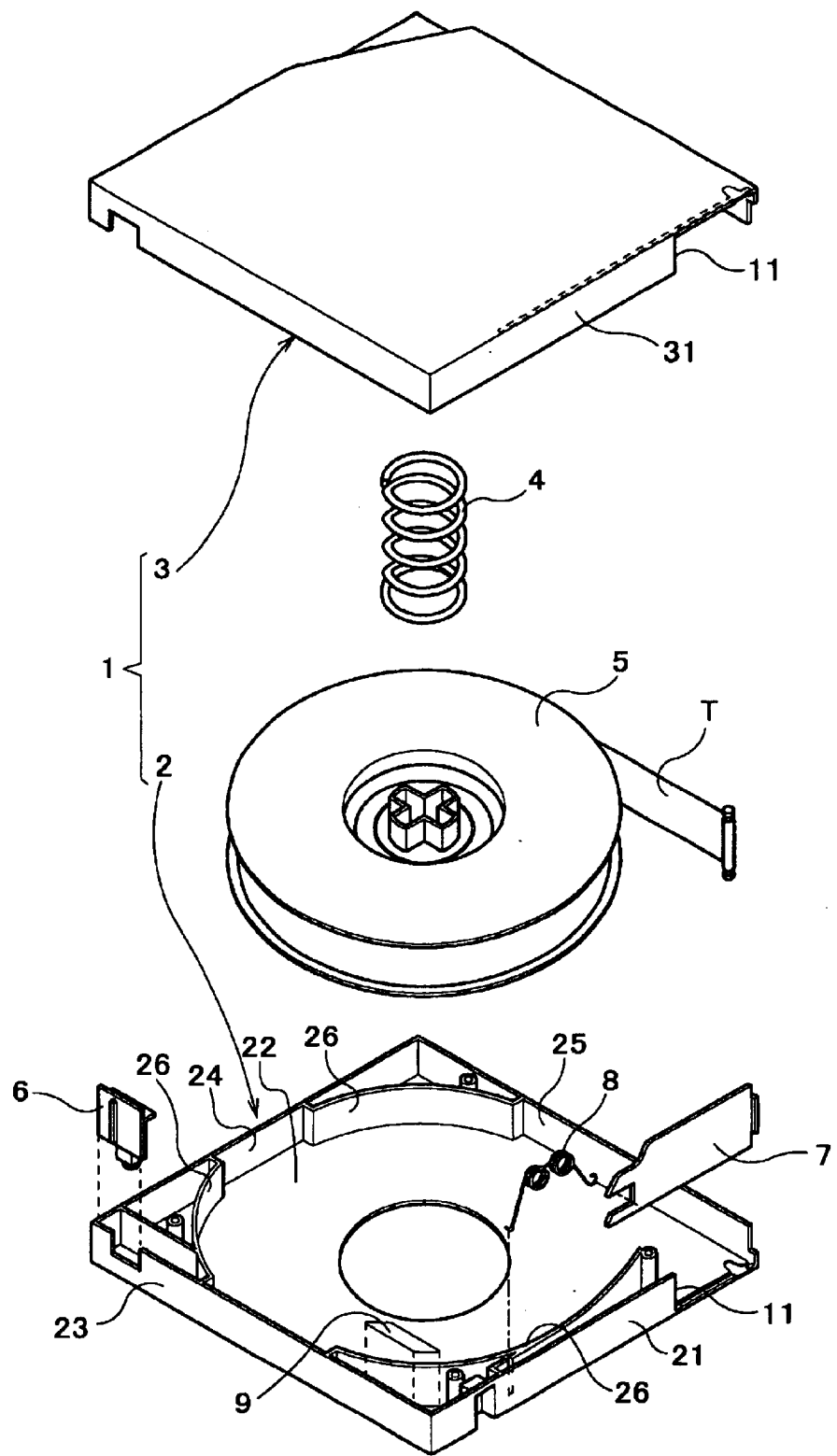
FIG. 1 is an exploded perspective view of the magnetic tape cartridge according to the present invention.

As shown in FIG. 1, a magnetic tape cartridge, a cartridge case 1, is composed of a lower half (one half) 2 and an upper half (another half) 3, between which a coil spring 4, a reel 5, a breakable tab 6 for preventing the accidentally erase, a slide door 7, a spring member 8, and a IC chip 9 are stored. In the cartridge case 1, an opening 11 for drawing a magnetic tape T out is formed ranging over the side wall 21 of lower half 2 and the side wall 31 of upper half 3.

The lower half 2 is the lower half part of the cartridge case 1 and is the case made of resin, such as polycarbonate and the like. The lower half 2 is composed of a bottom wall 22 of thin thickness and four side walls 21, 23, 24, and 25 surrounding the bottom wall 22. Ribs 26 for reinforcing the rigidity of the lower half 2 as a whole is disposed at the suitable position on the lower half 2 so as not to disturb the rotation of the reel.

Figure 2:
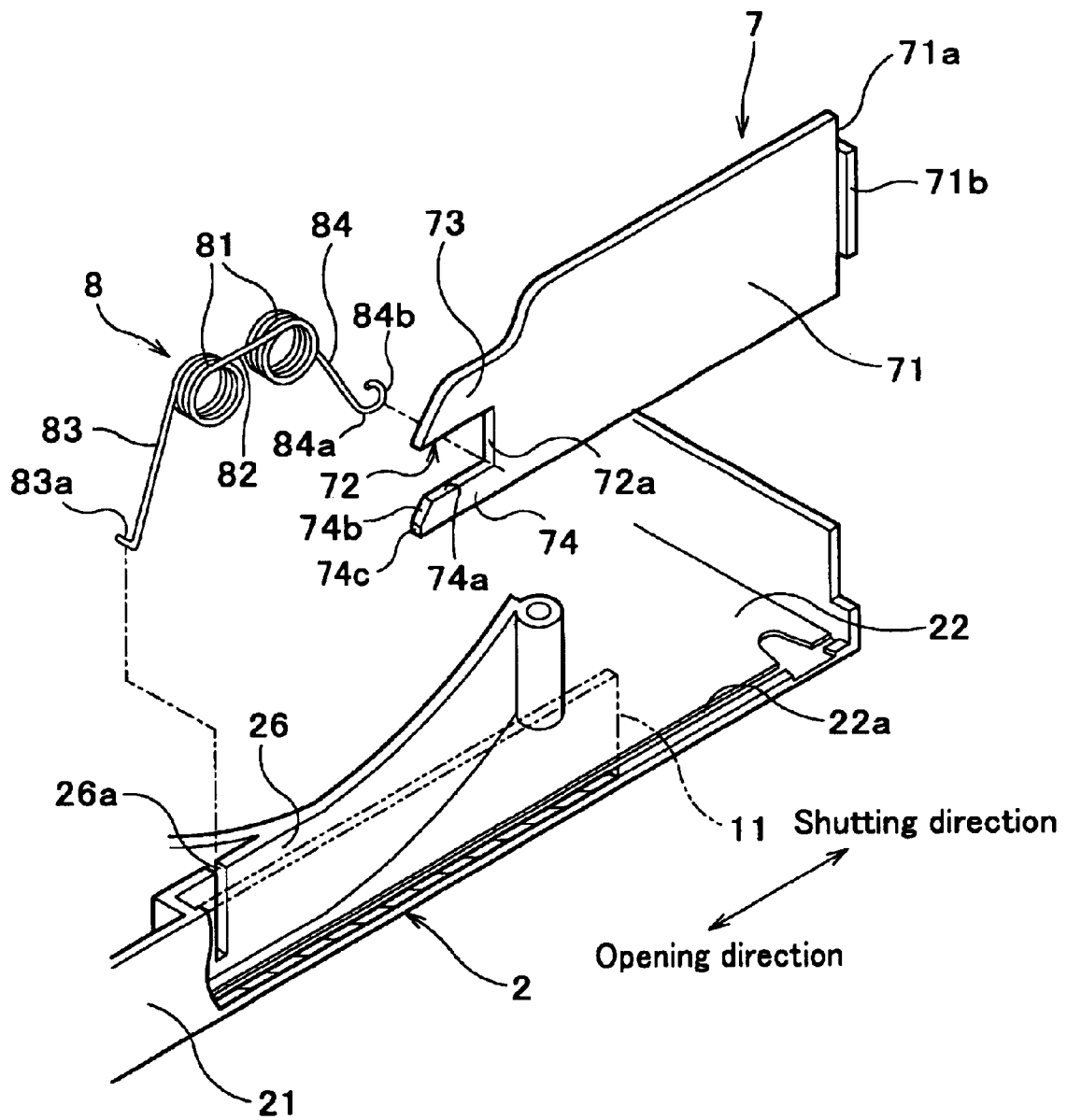
FIG. 2 is an enlarged view of the relevant part showing the slide door and the spring member, which are mounted on the lower half shown in FIG. 1.

As shown in FIG. 2, a guide groove (a guide part) 22a is formed at the bottom wall 22 of the lower half 2 along the side wall 21. A hooking part 26a for hooking the spring member 8 is formed on the rib 26 located near the guide groove 22a. This hooking part 26a has a slit shape in side viewing, and at the upper side of which is opened upward.

The slide door 7 is a plate having a nearly same thickness as the width of the guide groove 22a, and the shutting direction side thereof is served as the principal-plane part 71 for covering the opening 11 formed on the side wall 21. The notching part (spring engagement part) 72 is formed in the opening direction side of the slide door 7.

The opening direction side of the notching part 72 is served as protruding part 73, at the upper side of which is caved so as not to interfere with the spring member 8, and at the bottom side of which is served as a wedge part 74. The tip part of the wedge part 74 is formed in a wedge shape.

A shutter pull 71b for operating the slide door 7 is provided at the center section of side-face 71a located at the shutting direction end of the principal-plane part 71. Among the faces formed at the notching part 72, the face orthogonal to the opening-and-shutting direction is served as a depressing face 72a, which is pushed by the spring member 8. An upper face 74a for placing the spring member 8 is formed at the bottom end side of the depressing face 72a in the condition of having facing toward the direction perpendicular to the depressing face 72a.

A slope 74b, descending toward the opening direction side, is formed at the opening direction end of the upper face 74a. A tip face 74c prolonging downward is provided at the opening direction end of the slope 74b.

The spring member 8 is composed of coil part 81 and 81 adjoining along the shutting-and-opening direction, a connecting part 82 for connecting the coil part 81 and 81 each other, and spring arm 83 and 84. The spring arm 83 is prolonged from the opening direction end of the coil part 81 and is used for fixing, and the spring arm 84 is prolonged from the shutting direction end of the coil part 81 and is used for pushing.

A latch 83a for hooking on the hooking part 26a of rib 26 is formed at the tip (end) part side of the spring arm 83 by bending the tip part so as to be orthogonal to the rib 26.

The spring arm 84 is bent toward the orthogonal direction with respect to the principal-plane part 71, and the tip part side of which is further bent toward the shutting direction side. A tip part 84*a* (one end part or a front end) for pushing the depressing face 72*a* of the slide door 7 is thus provided. A guide part 84*b* having an arc shape in side viewing is provided at the tip end side of this tip part 84*a* for achieving the assembling of the cartridge case 1 with ease.

The explanation about the attaching manner of the slide door 7 and the spring member 8 to the lower half 2 will be carried out.

First, as shown in FIG. 3A, hooking the latch 83*a* of the spring arm 83 to the hooking part 26*a* of the rib 26 from the upper direction, and placing the tip part 84*a* of the spring arm 84 on the guide groove 22*a*.

Then, inserting the slide door 7 toward the opening direction side from the shutting direction side while keeping the condition that the wedge part 74 and the protruding part 73 side of the slide door 7 is tilting downwardly.

At that time, when the tip face 74*c* of the wedge part 74 is inserted to the guide groove 22*a* while pushing down the principal-plane part 71 downwardly, the slide door 7 is slid toward the opening direction side.

When the tip face 74*c* of the wedge part 74 is contacted with the guide part 84*b* of the spring arm 84, as shown in FIG. 3B, since the guide part 84*b* has and arc shape, the upper end of the tip face 74*c* crawls under the guide part 84*b*.

Thus, the guide part 84*b* is lifted by the tip face 74*c*, and the spring member 8 is rotated centering on the latch 83*a* of the spring arm 83.

When the slide door 7 is further moved, the guide part 84*b* is further lifted along the slope 74*b* of the wedge part 74.

When the bottom of the guide part 84*b* reaches at the top end of the slope 74*b*, as shown in FIG. 3C, the tip part 84*a* rides on the upper face 74*a* of the wedge part 74.

When the slide door 7 is further moved to the opening direction side, the tip part 84*a* approaches the depressing face 72*a*.

When the bottom of the slide door 7 is completely engaged with the guide groove 22*a*, the guide part 84*b* of spring member 8 is fitted with the depressing face 72*a* of the slide door 7 in the condition that the depressing face 72*a* is pressed toward the shutting direction.

According to the present invention, the effectiveness as below can be obtained. Since the guide part 72 is provided, the tip part 84*a* of the spring arm 84 is guided to the notching part 72 of the slide door 7 without interference, thus the tip part of the spring member does not get stuck with the slide door like a conventional construction.

In the attaching operation of the spring member and the slide door, the picking up operation of the spring member by the man work can be omitted, the automation of the manufacturing line of the magnetic tape cartridge can be easily achieved.

Figure 4:
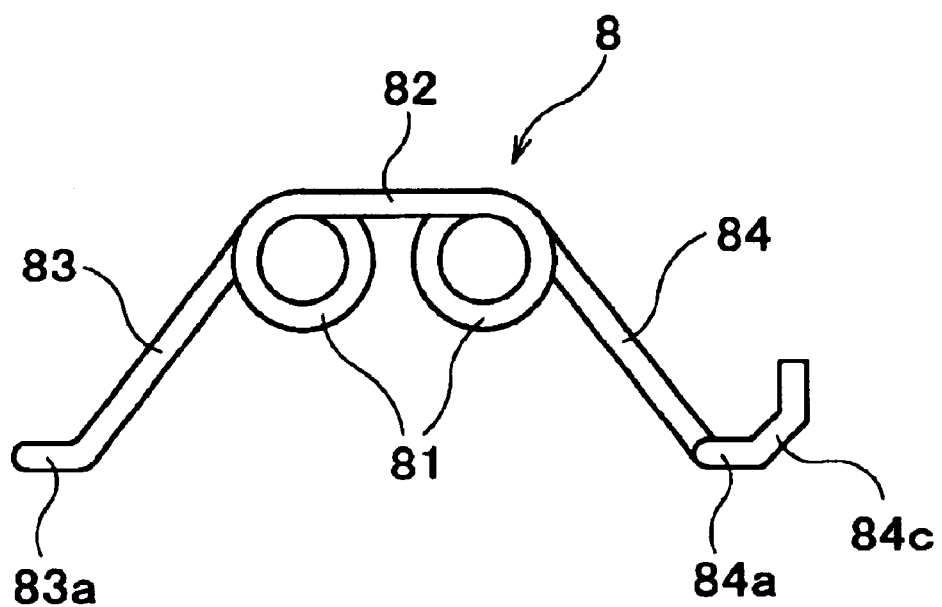
FIG. 4 is a front view showing the another preferred embodiment of the spring member.

In the preset embodiment, the shape of the guide part of the spring member is formed in the arc shape, but another shape of the guide part may be acceptable. For example, the shape as shown in FIG. 4 can be acceptable. To be more precise, as shown in FIG. 4, the shape, in which the tip part 84*a* is bent upwardly in the shutting direction side and further bent in the right above direction at the tip end side thereof, can be acceptable.

In the present embodiment, the spring member, in which two of adjoining coils having a prolonged spring arm, respectively, are arranged, is adopted. The spring member is not restricted to this case, any type of shapes and materials can be acceptable as long as the guide part is arranged at the one end part of the spring member.

In the present embodiment, furthermore, the guide part is formed by bending the tip side of the spring arm. The formation manner of the guide part is not restricted to this case, any type of the guide part may be acceptable as long as the one end part of the spring member can be guided to the spring engaging part of the slide door without any interference.

For example, the cap having a lock-and-key shape with respect to the guide part, and is made of resin etc, and is arranged at the tip part of the spring arm, can be acceptable.

The advantages brought from the present invention is not affected even if the shape at the tip of the wedge part 74 is not formed in the certain plane shape. For example, when roundish shape, the cusped shape, and the like are adopted as the shape of the tip at the wedge part 74, the assembling of the magnetic tape cartridge can be achieved with ease.

Second Preferred Embodiment

The explanation about the second preferred embodiment of the magnetic tape cartridge according to the present invention will be carried out as below. In the following explanation, the components same as explained in the first preferred embodiment is indicated by the same symbols and the explanation thereof is omitted.

Figure 5:
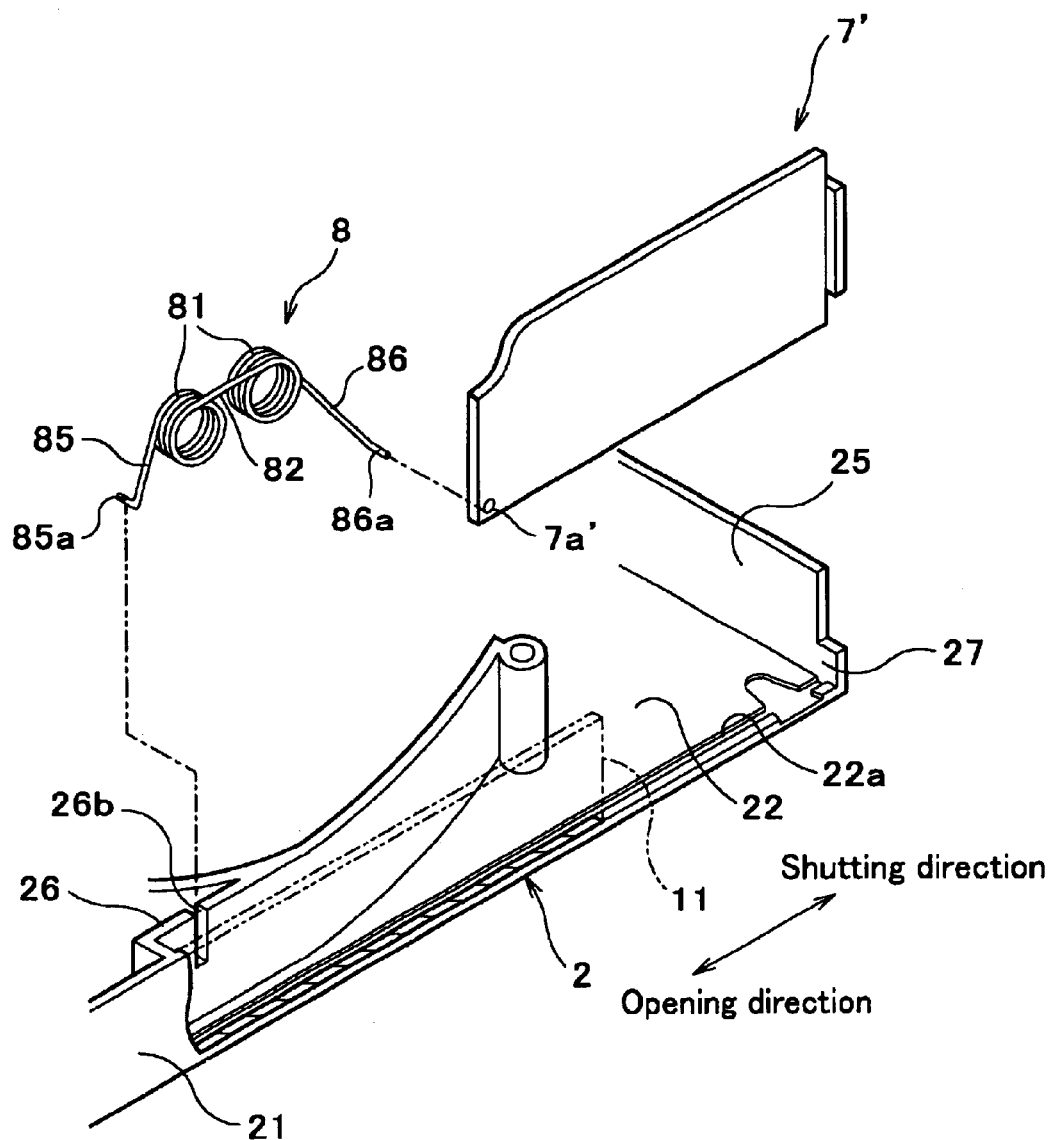
FIG. 5 is an enlarged view of the relevant part showing the lower half, the slide door, and the spring member.

As shown in FIG. 5, a hooking part 26*b* is formed on the rib 26 of the lower half 2, so as to be prolonged to the almost mid position in the height direction of the rib 26.

A slide door 7' is a plate having the same thickness as the width of the guide groove 22*a*. The size of the slide door 7' at the shutting direction side is established so as to cover the opening 11 formed on the side wall 21. At the opening direction side of the slide door 7' is caved so as not to interfere with the spring member 8.

A hooking hole 7*a'* for connecting with the spring member 8 is bored at the vicinity of the bottom in the opening direction side of the slide door 7'. The position of the hooking hole 7*a'* is established at the lower side than the top end of a slider stop 27 arranged at the side wall 25.

The spring member 8 is composed of coil part 81 and 81 adjoining along the shutting-and-opening direction, a connecting part 82 for connecting the coil part 81 and 81 each other, and a spring arm 85 and 86. The spring arm 85 is prolonged from the opening direction end of the coil part 81 and is used for hooking, and the spring arm 86 is prolonged from the shutting direction end of the coil part 81 and is used for pushing the slide door 7'.

A latch 85*a* for hooking on the hooking part 26*b* of rib 26 is formed at the tip (end) part of the spring arm 85 by bending the tip part so as to be orthogonal to the rib 26.

A tip part 86*a* for engaging with the hooking hole 7*a'* of the slide door 7' is formed at the tip of the spring arm 86. The tip part 86*a* is formed by bending the tip towards the orthogonal direction with respect to the slide door 7'.

The length of the spring arm 86 is established longer than the spring arm 85, so that two of adjoining coils 81 and 81 may be in the horizontal condition, when a latch 85*a* of the spring arm 85 and the tip part 86*a* are engaged with the hooking part 26*b* and the hooking hole 7*a'*, respectively.

Figure 6:
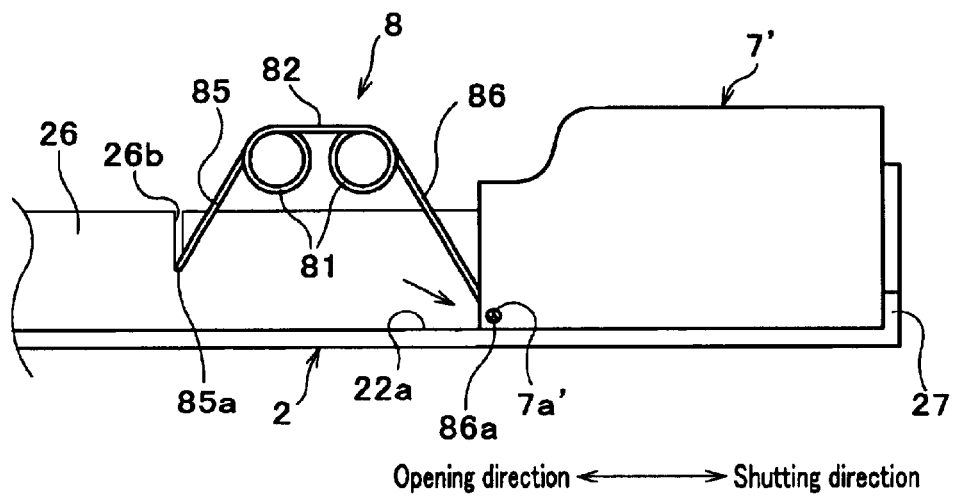
FIG. 6 is a sectional view showing the condition that the spring member and the slide door of FIG. 5 are certainly attached to the guide groove of the lower half

The explanation about the attaching manner of the slide door 7' and the spring member 8 to the lower half 2 will be carried out with referring to FIG. 5 through FIG. 6.

First, engaging the tip part 86*a* of the spring arm 86 with the hooking hole 7*a'* of the slide door 7'. Next, hooking the latch 85*a* of the spring arm 85 to the hooking part 26*b* of the rib 21 from the upper direction. Then, putting down the slide door 7' on the guide groove 22*a* by moving the slide door 7' to the opening direction while weighting down the spring member 8.

Finally, sliding the slide door 7' to the shutting direction side, and bringing the bottom end in the shutting direction side of the slide door 7' into contact with the slider stop 27 of the side wall 25. Thus, as shown in FIG. 6, the slide door 7' is engaged with the guide groove 22*a* formed on the lower half 2.

Since the latch 85*a* of the spring member 8 is supported by the hooking part 26*b* and the tip part 86*a* of the spring member 8 is engaged with the hooking hole 7*a*', the slide door 7' is impelled to the shutting direction side by the spring member 8 compressed between the slide door 7' and the hooking part 26*b*.

At that time, the position the hooking hole 7*a*' is bored is lower than the top end of the slider stop 27, and the position latch 85*a* of the spring member 8 is supported by the hooking part 26*b* is higher than the hooking hole 7*a*'. Thus, the slide door 7' and the spring member 8 are attached to the lower half 2 in the condition that the urging force towards the lower side and the shutting direction side is applying to the hooking hole 7*a*' of the slide door 7'.

According to the present preferred embodiment, the effectiveness as below can be obtained.

Since the urging force towards the lower side and the shutting direction side with respect to the slide door 7' is applied to the slide door 7', the lifting movement of the slide door 7' caused by the rotation centering on the bottom end in the shutting direction end of the slide door 7' is prevented.

Therefore, the attaching operation of the spring member 8 and the slide door 7', and the assembling operation of the lower half 2 and the upper half 3 can be achieved with ease. Thus, the automation of the manufacturing line of the magnetic tape cartridge can be easily achieved.

The present invention is not restricted to the above described embodiment, and is represented by the various manner.

In the present embodiment, the hooking part 26*b* is provided so as to be located at the higher position than the guide groove. The present invention is not restricted to this case, any type of construction can be adopted as long as the tip part in the opening direction side of the spring member is located at the higher position than the position of the tip part in the shutting direction side.

Figure 7:
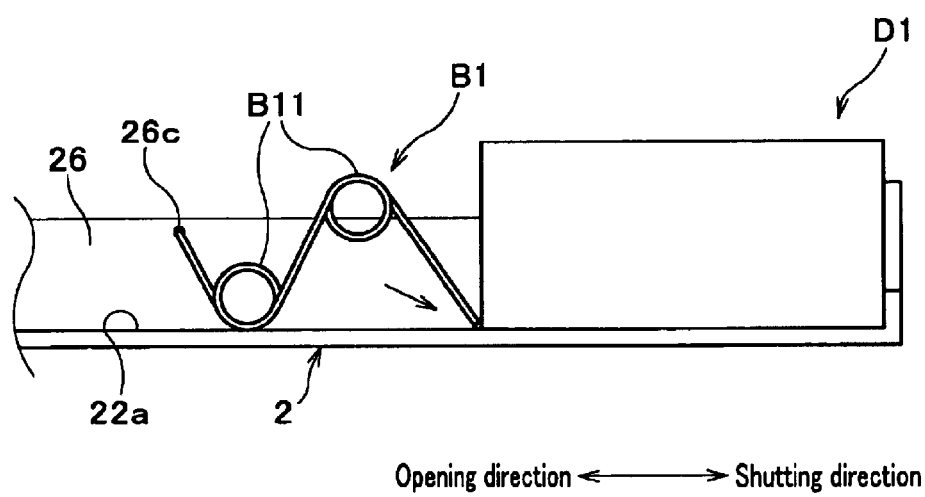
FIG. 7 is a sectional view showing the another preferred embodiment of the magnetic tape cartridge accirding to the present invention.

When a helical torsion coil spring B1 having a zigzagged shape and the coil part B11 is arranged at the flection part thereof is adopted, as shown in FIG. 7, the construction, in which a hooking hole 26*c* for hooking the end part in the opening direction side of the helical torsion coil member B1 is provided, can be acceptable.

In this construction, the end part in the opening direction side of the helical torsion coil member B1 is supported by the hooking hole 26*c*, the end part in the shutting direction side thereof is placed on the guide groove 22*a* and presses the bottom part of the slide door D1 to the shutting direction side.

The shapes and the materials of the spring member is not restricted to this case, any type of modification can be acceptable.

Third Preferred Embodiment

The explanation about the third preferred embodiment of the magnetic tape cartridge according to the present invention will be carried out as below. In the following explanation, the components same as explained in the first preferred embodiment is indicated by the same symbols and the explanation thereof is omitted.

Figure 8:
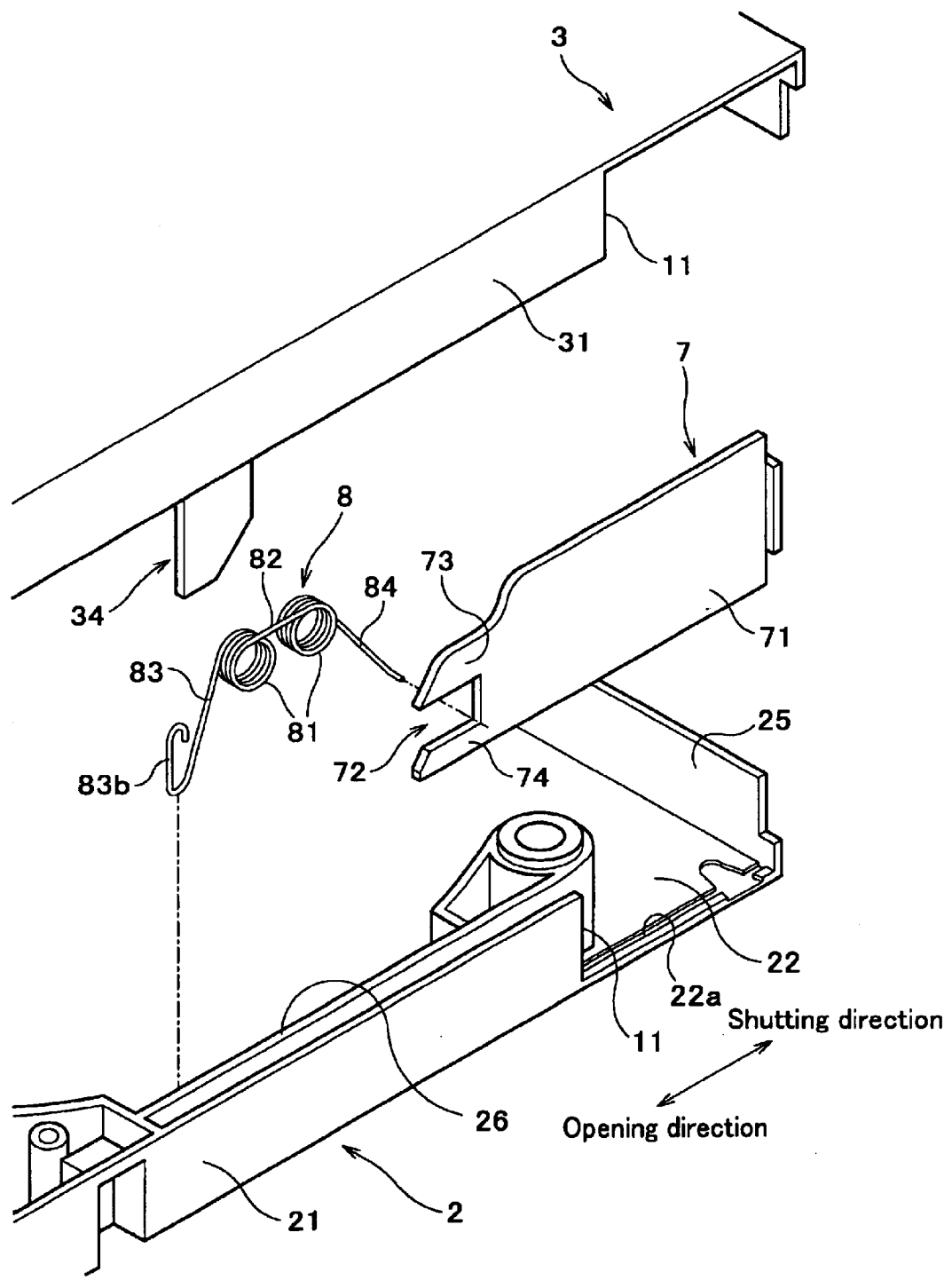
FIG. 8 is an enlarged view showing the relevant part of the upper half, lower half, the slide door, and the spring member according to the present invention.

As shown in FIG. 8, a flection part 83*b* (a supported part, pressed means) is formed at opening direction side of the spring arm 83 of the spring member 8. This flection part 83*b* is formed by bending the spring arm 83 upwardly at the tip part side and further bending downwardly at it's tip end.

Figure 9:
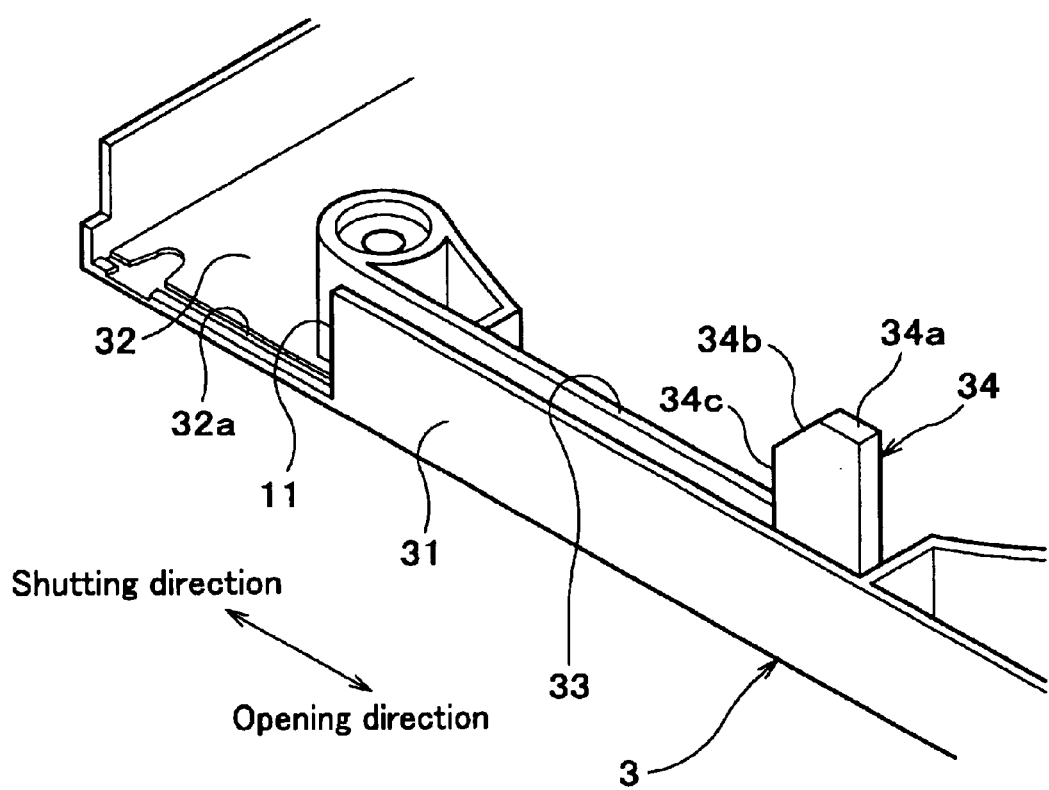
FIG. 9 is an enlarged view showing the relevant part of the inside of the upper half.

As shown in FIG. 9, the upper half 3 is a case made of the same resin as the lower half 2, and a side wall 31 having an opening 11, a rib 33 for reinforcing, and the like are provided thereto. The position, the side wall 31 and the rib 33 are established, is determined so as to be agreed with the side wall 21 and the rib 26 of the lower half without play, when the upper half and the lower half are assembled together.

A guide groove (guide part) 32*a* having the same width and the length as the guide groove 22*a* of the lower half 2 is provided between the side wall 31 and the rib 33. The rib 33 is disposed along the side wall 31. A projection part 34 (a spring supporting part) is disposed at the end part in the opening direction side of the guide groove 32*a*.

The projection part 34 is a plate having a nearly same thickness as the width of the guide groove 32*a*. A slope 34*b* descending toward the shutting direction side is provided at the end part in the shutting direction side of a top end 34*a*. The top end 34*a* is positioned at the lower half side (an upper side in FIG. 9) of the projection part 34. A supporting face (a spring supporting face) 34*c* prolonging toward the lower half 2 side is served at the end in the shutting direction side of the slope 34*b*.

The attaching manner of the slide door 7 and the spring member 8 to the cartridge case 1 will be carried out.

Figure 10A:
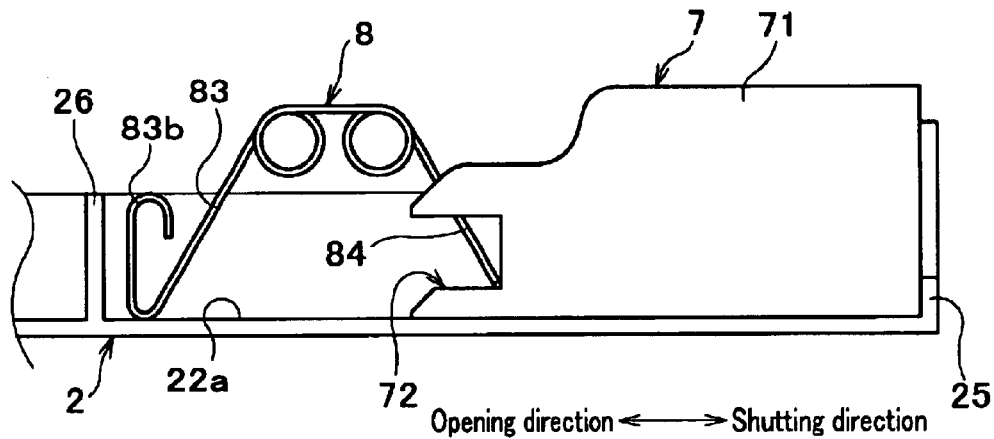
FIG. 10A is a sectional view showing the condition that the slide door and the spring member is attached to the lower half.

As shown in FIG. 10A, first, placing the slide door 7 and the spring member 8 to the guide groove 22*a* of the lower half 2 in the condition that the tip part of the spring arm 84 is fitting with the notching part 72 of the slide door 7. At that time, the clearance is formed between the rib 26 and the flection part 83*b* of the spring arm 83 by shifing the slide door 7 to the side wall 25 side.

Figure 10B:
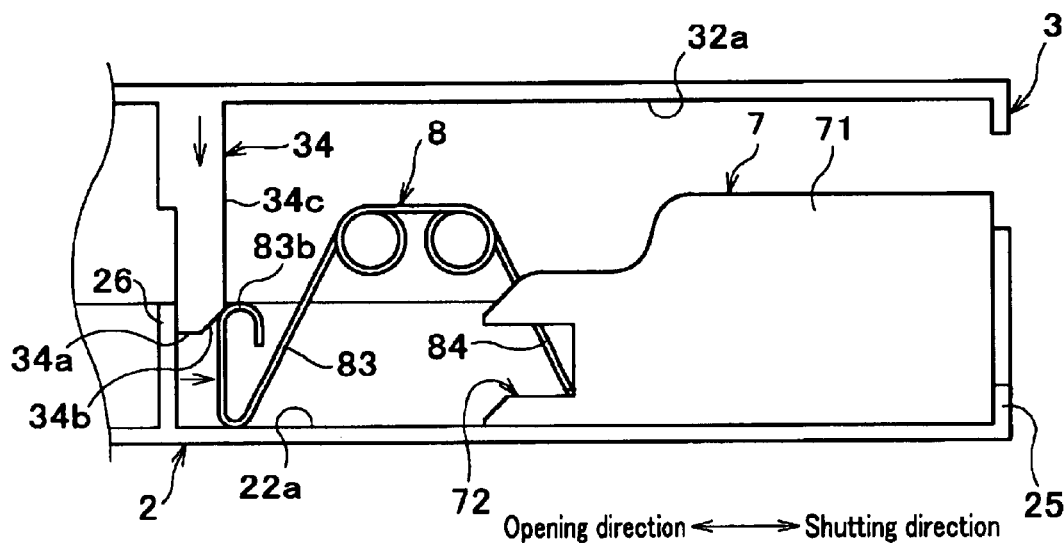
FIG. 10B is a sectional view showing the condition that the flection of the spring member is fit with the slope of the projection part.

Next, as shown in FIG. 10B, sending down the upper half 3 to the lower half 2, the slide door 7 and the spring member 8 are arranged thereon.

When the slope 34*b* of the projection part 34 is set in touch with the flection part 83*b* of the spring member 8, the flection part 83*b* is moved toward the shutting direction side by the slope 34*b*, and thus the spring member 8 is compressed.

Figure 10C:
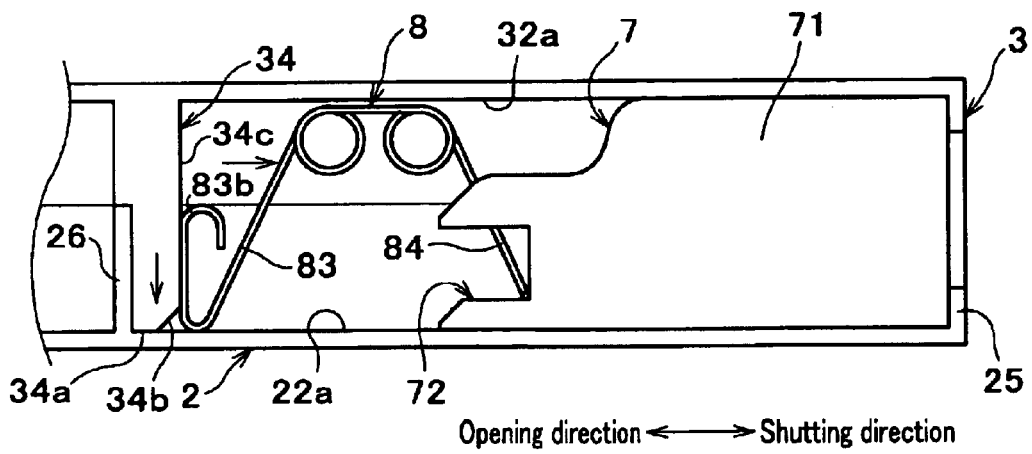
FIG. 10C is a sectional view showing the condition that the upper half and the lower half are assembled together.

When the upper half 3 is further sent downward, as shown in FIG. 10C, the flection part 83*b* of the spring member 8 is moved toward the shutting direction side as a result of the sliding movement along the slope 34*b* of the prejection part 34. Then, the projection part 34 is sent downward while sliding along the back side of the flection part 83*b*. Thus, the opening direction side of the spring member 8 is retained by the supporting face 34*c*.

Finally, engaging the upper half 3 with the lower half 2 completely, the assembling operation of the upper half 3 and the lower half 2 is thus achieved.

According to the present invention, the effectiveness as below can be obtained.

Since the flection part 83*b* of the spring member 8 slid along the slope 34*b* of the projection part 34 and is fit with the projection part 34 over the whole, the spring member 8 is compressed between the slide door 7 and the projection part 34. Therefore, the spring member 8 is impelled to the shutting direction side.

The attaching operation of the spring member 8 and the slide door 7 to the lower half 2 thus can be achieved without impelling the slide door 7 to the shutting direction side using a man work.

In the present embodiment, furthermore, the occurrence of the lifting movement of the slide door 7 caused by the urging force brought by the spring member is prevented, and the attaching operation of the slide door 7 and the spring member 8 can be carried out with ease.

The present invention is not restricted to the above described case, and is represented by various embodiment.

(1) In the present embodiment, the projection part having the slope is served as the spring supporting part, and the spring member having the flection part is served as the supported part and the pressed means. The present invention is not restricted to this case, for example, the construction, only the spring supporting part is adopted, can be acceptable.

As an example of such case, as shown in FIG. 11, the projection part P1 can be adopted as the spring supporting part. This projection part P1 has a square pole shape and is prolonging downwardly from the end part in the opening direction side of the guide groove 32a.

In this instance, the adoption of the sheet spring B2 formed in the wave like shape and the slide door D2 having a rectangular plate shape, which are well-known in the conventional art, is preferable.

In the assembling manner of the magnetic tape cartridge having such formation, first, placing the slide door D2 and the sheet spring B2 on the guide groove 22a. Next, sending down the projection part P1 from above at the opening direction side of the sheet spring B2, and pushing down the slope part B21 by the edge of the projection part P1. Thus, the lower end of the slope part B21 is moved to the shutting direction side and the sheet spring B2 is compressed.

As a result of the compression of the sheet spring B2, the slide door D2 is impelled to the shutting direction side.

In the present invention, furthermore, the combination as shown in FIG. 12 can be acceptable. In this combination, a helical torsion coil spring B3, a slide door D2, and a spring supporting part are adopted. The helical torsion coil spring B3 has a zigzagged shape and three of coil part B31 is provided at the flection part thereof. The slide door D2 has a rectangular plate shape and a hooking hole D21, to which an end part in the shutting direction side of the helical torsion coil spring B3 is engaged, is bored thereto.

In this construction, the spring supporting part is composed of a projection part P2, a hooking part P21, and a guide surface P22. The projection part P2 is provided at the opening direction side of the guide groove 32a so as to be protruded downwardly. The hooking part P21 of slit like shape is provided at the lower part of the projection part P2. The guide surface P22 is formed on the hooking part P21 for guiding the end part in the opening direction side of the helical torsion coil spring B2.

In the assembling manner of the magnetic tape cartridge having such construction, first, placing the helical torsion coil spring B3 and the slide door D2, which are previously assembled together, on the guide groove 22a.

When the upper half 3 is pressed downward as hooking the end part of the helical torsion coil spring B3 on the hooking part P21 of the projection part P2, the end part in the opening direction side of the helical torsion coil spring B3 is moved downward.

As a result of this movement, the helical torsion coil spring B3 is compressed, and thus the slide door D2 is impelled to the shutting direction side.

The combination as shown in FIG. 13 can be acceptable. In this combination, a slide door D2, a supporting shaft B4, a spring member B4, and a spring supporting part 34 are adopted. The slide door D2 has a rectangular plate shape. A supporting shaft J is protruded from the slide door D2 towards the opening direction side. The spring member B4 is wound around the supporting shaft J. The spring support part 34 is composed of the adjoined rectangular plate, which is same as above described projection part 34. In this construction, the spring support part 34 is provided so that the supporting shaft J is sandwiched between there, and so that the end part in the opening direction of the spring member B4 is made contact with the spring support part 34.

In the assembling manner of the magnetic tape cartridge having such construction, first, placing the slide door D2 on the guide groove 22a. On this occasion, the spring member B4 is previously fit on the supporting shaft J of the slide door D2. Next, pushing the upper half 3 downwardly in the condition that the supporting shaft J is sandwiched between two of projection part 34 and 34. Thus, since the end part in the opening direction side of the spring member B4 is slid along the slope 34b and 34b, the spring member B4 is compressed toward the shutting direction side. As a result of the compression of the spring member B4, the slide door D2 is impelled to the shutting direction side.

(2) In the present embodiment, the projection part prolonging downwardly from the guide groove of the upper half is served as the spring supporting part. The spring supporting part is not restricted to this case, any type of modification can be adaptable as long as the certain supporting of the spring member is achieved.

Figure 14:
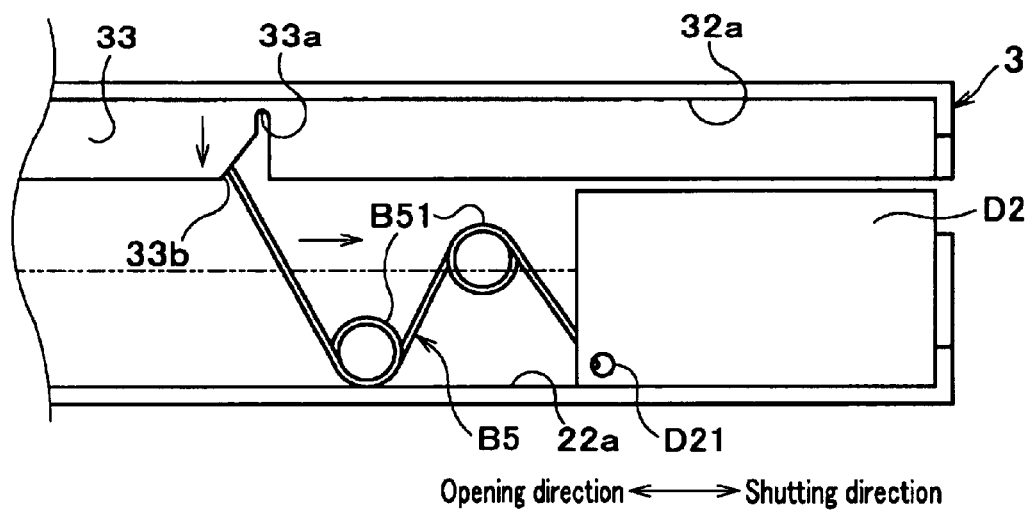
FIG. 14 is a sectional view showing the other preferred embodiment of the magnetic tape cartridge according to the present invention.

In the present invention, the construction as shown in FIG. 14 is adaptable. In this construction, a spring member B5, a slide door D2, and a spring supporting part are adopted. The spring member B5 has a zigzagged shape and two of coil parts B51 are arranged at the flection part thereof. The slide door D2 has a rectangular plate shape and a hooking hole D21 for hooking the end part in the shutting direction side of the spring member B5 is provided thereto. The spring supporting part is composed of a slit part 33a and a slope 33b. The slit part 33a is disposed on the rib 33 arranged along the guide groove 32a of the upper half 3. The slope 33b inclining toward the opening direction side is provided at the opening direction side of the slit part 33a.

In the assembling manner of the magnetic tape cartridge having this construction, first, placing the spring member B5 and the slide door D2, which are previously assembled together, on the guide groove 22a. Next, pressing the upper half 3 downwardly in the condition that the end part in the opening direction side of the spring member B5 is made contact with the slope 33b of the rib 33. Thus, the end part of the spring member B5 is slid toward the shutting direction side, and engaged with the slit 33a. Since the end part of the spring member B5 is slid and engaged with the slit 33a, the spring member B5 is compressed. Thus, the slide door D2 is impelled to the shutting direction side.

(3) In the present embodiment, the flection part, which is formed at the tip of the spring arm of the spring member, is served as the pressed means. Another kind of means may be acceptable as long as it can move the spring member to the shutting direction side by engaging with the spring supporting part. For example, the manner, in which the cap having a lock-and-key shape with respect to the guide part and made of resin etc is arranged at the tip part of the spring arm, can be acceptable.

Figure 15:
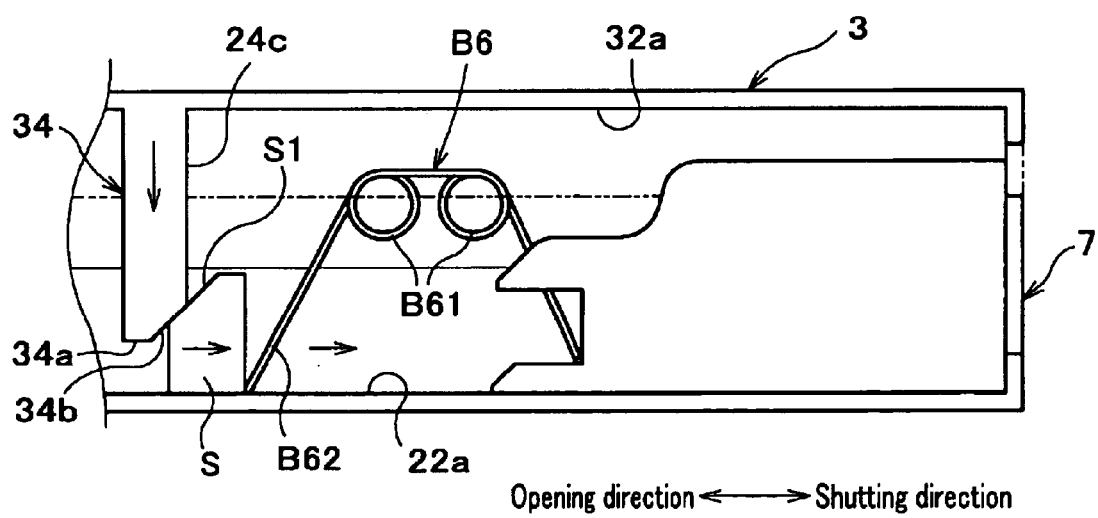
FIG. 15 is a sectional view showing the another preferred embodiment of the magnetic tape cartridge according to the present invention.

As shown in FIG. 15, furthermore, a slider S, which is disposed at the shutting direction side of the guide groove 22a and which can slide along the guide groove 22a, can be adopted as the pressed means. This slider S has a slope S1 which is parallel to the slope 34b formed on the projection part of the upper half 3.

In this construction, when the upper half 3 is pressed downward, since the slider S is slid along the slope 34b of the projection part 34, the slider S is moved to the shutting direction side. As a result of the sliding movement of the slider S, the spring member B6 is compressed, and thus the slide door 7 is impelled to the shutting direction side by the spring member B6. In the view of the manufacturing cost, however, it is preferable that the spring member and the pressed means are formed into the integral body.

(4) In the present embodiment, the flection part is formed by bending the end part side of the spring arm upward, and bending the tip part into the circular shape further. The shape of the flection part is not restricted to this, for example, the shape, in which the tip part of the spring arm is bent so as to be parallel to the slope of the projection part, can be acceptable.

(5) In the present embodiment, the spring member having two of adjoining coil part, from which a spring arm is prolonged, respectively, is served as the spring member. The shapes and materials of the spring member is not restricted, and can be modified depending on the situation as long as the pressed means is at least disposed at either supported part.

(6) In the present embodiment, the projection part is disposed at the end part in the opening direction side of the guide groove formed on the upper half. The location of the projection part is not restricted to this case as long as the slope of the projection part can be contacted with the pressed means of the spring member.

Also, the modification of the shape of the projection part can be carried out arbitrarily. For example, the curved surface is acceptable as the shape of the slope of the projection part. In the present embodiment, furthermore, the projection part is integrally formed with the upper half, but not restricted to this case. It is acceptable that the projection part is provided at the upper half as the another member.

(7) In the present embodiment, the end part in the shutting direction side of the spring member is supported by the spring supporting means, but the present invention is not restricted to this, as long as either supported part of the spring member is supported.

Figure 16:
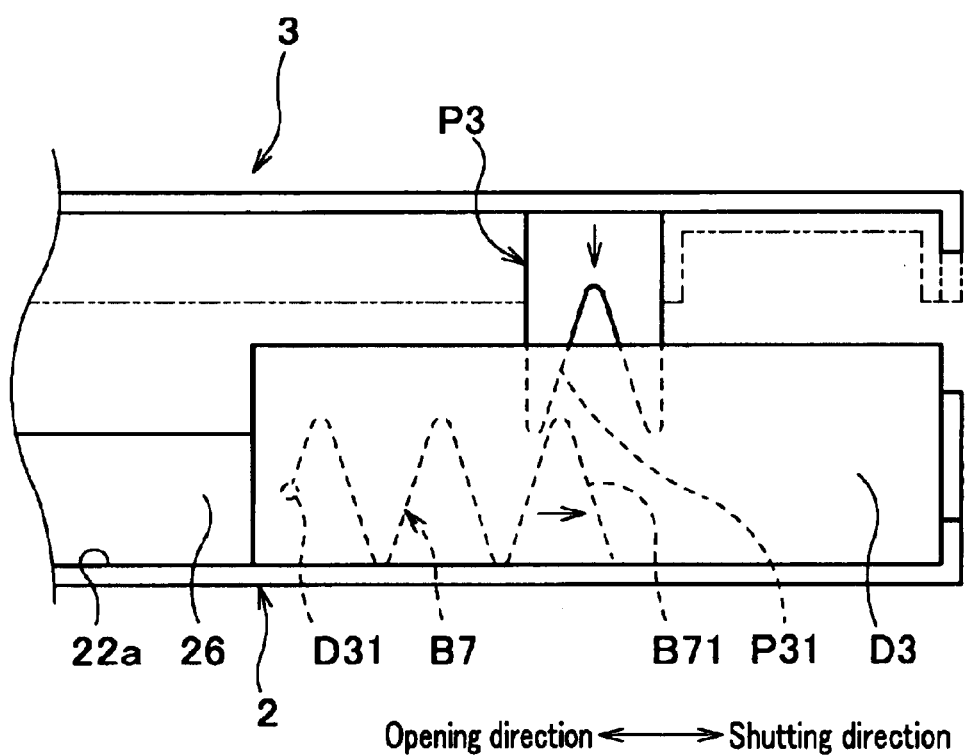
FIG. 16 is a sectional view showing the other preferred embodiment of the magnetic tape cartridge according to the present invention.
Figure 17:
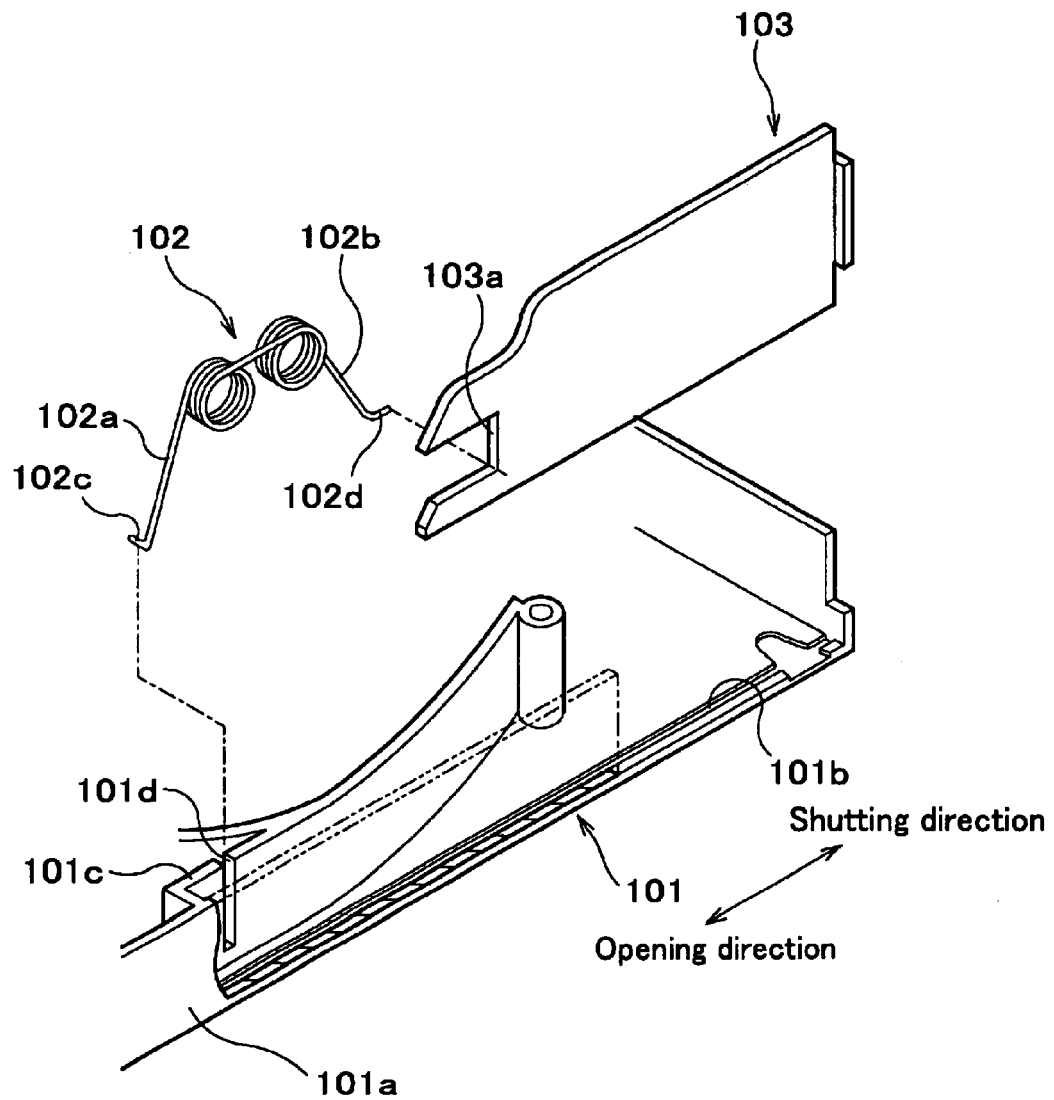
FIG. 17 is an enlarged view showing the relevant construction of the conventional magnetic tape cartridge according to the present invention.
Figure 18A:
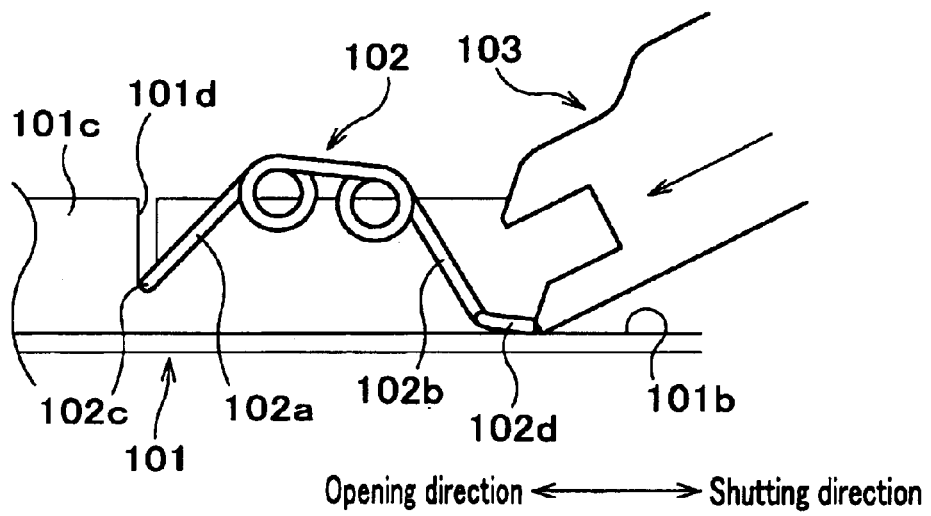
FIG. 18A is a sectional view showing the condition that the spring member is attached to the lower half of shown in FIG. 17.
Figure 18B:
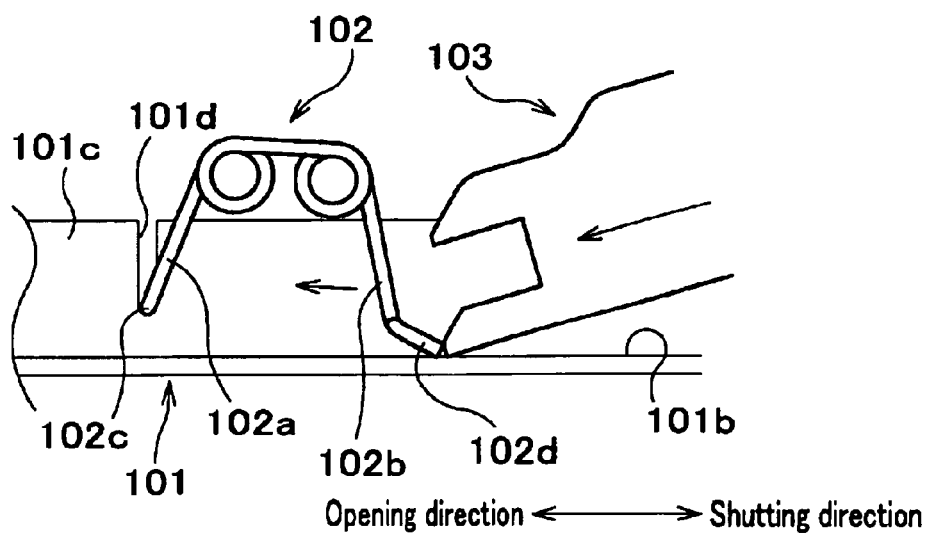
FIG. 18B is a sectional view showing the condintion that the spring member is caught on the slide door.
Figure 19:
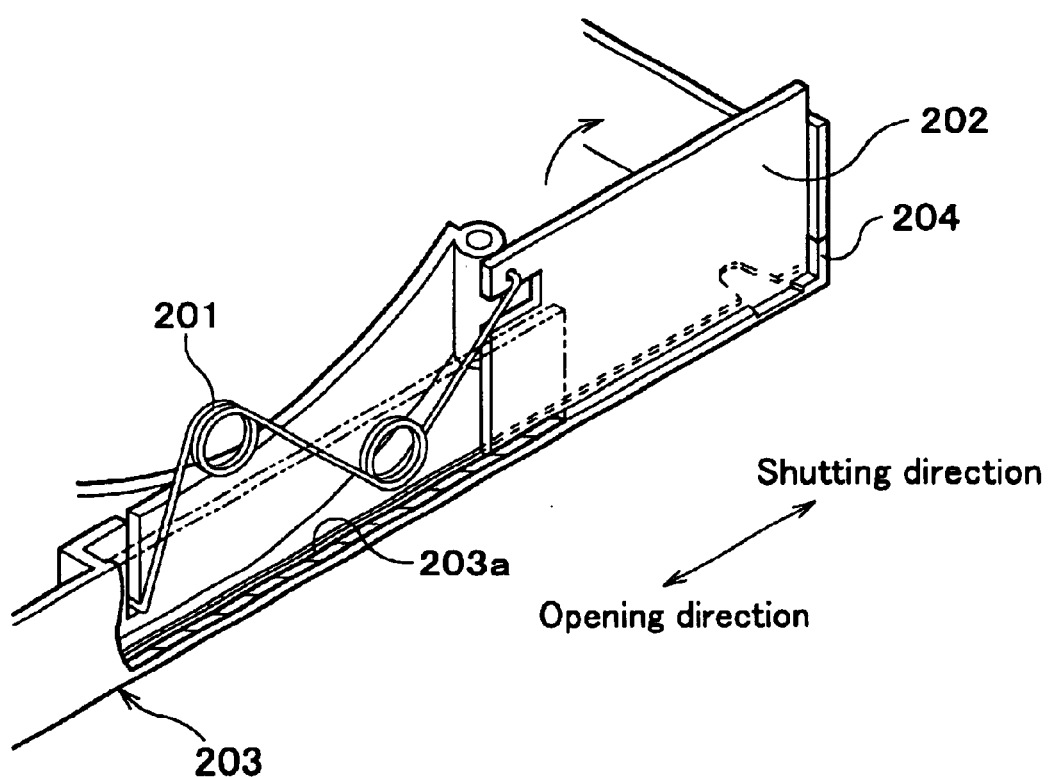
FIG. 19 is an enlarged view showing the relevant construction of the conventional magnetic tape cartridge.

For example, the construction shown in FIG. 16 can be acceptable. In this construction, a sheet spring B7 having a wave like shape, and a projection part P3 having a recessed part P31 are adopted.

In this construction, the recessed part P31 of the projection part P3 is served as the spring supporting part. In this construction, furthermore, the sheet spring B7 is disposed between the rib 26 of the lower half 2 and the slide door D3 which slide on the guide groove 22*a* of the lower half 2.

The slide door D3 has a length twice times longer than the overall length of the sheet spring B7 and has a protruding part D31 projecting toward the rib 26 side at the opening direction side thereof. Thus, the sheet spring B7 is attached to the slide door D3 by hooking the end part in the opening direction side of the slide door D3 to the protruding part D31.

In the assembling manner of the magnetic tape cartridge having such construction, first, placing the sheet spring B7 and the slide door D3, which are previously assembled together, on the guide groove 22*a* of the lower half 2.

Next, pressing the upper half 3 downwardly while keeping the engagement between the protruding part B71 of the sheet spring B7 and the recessed part P31 of the projection part P3. Thus, the protruding part 71 of the sheet spring B7 is moved in the shutting direction side, because the protruding part 71 is pressed by the recessed portion P31.

As a result of the movement of the protruding part B71 of the sheet spring B7, since the sheet spring B7 is expanded, the slide door D3 is impelled to the shutting direction side.

According to the present invention, since one end part of the spring member is guided to the spring engaging part by the guide part provide at the one end part of the spring member, the sticking of the end part of the spring member with the slide door can be prevented. Thus the automation of the product line of the magnetic tape cartridge can be achieved with ease.

What is claimed is:

1. A magnetic tape cartridge comprising:

an opening provided on one side wall of a cartridge case, and is used for tape drawing;

a slide door slidably supported by a guide part disposed along said one side wall, and said slide door is used for achieving a shutting-and-opening operation of said opening;

a spring member for impelling said slide door to a shutting direction side, and is placed on said guide part; and a leading part of said spring member for leading one end part of said spring member to a spring engaging part provided on said slide door, and is provided at one end part of said spring member, wherein said spring engaging part is a notching part provided at an opening direction side of said slide door, and a lower bottom of said notching part is formed in a wedge shape, and said leading part is formed by bending the one end part of said spring member in an arc shape for engaging the lower bottom of said notching part and leading said leading part to said notching part.

2. The magnetic tape cartridge according to claim 1, wherein an end of said spring member, opposite to said leading part, is pivotally supported by a hooking part provided on a rim of the magnetic tape cartridge.

3. The magnetic tape cartridge according to claim 1, wherein said spring member comprises:

a first and second coil part which are adjoined along a shutting-and-opening direction of said slide door;

a connecting part for connecting said first and second coil parts;

a first spring arm which extends from said first coil part, where said first spring arm is placed at said opening direction side; and a second spring arm which extends from said second coil part, where said second spring arm is placed at said shutting direction side.

4. The magnetic tape cartridge according to claim 3, wherein an end part of said second spring arm is bent to an orthogonal direction with respect to a sliding direction of said slide door, and said end part is further bent to said shutting direction side of said slide door, wherein said end part of said second spring arm forms said leading part.

* * * * *